(12) United States Patent
Pasta et al.

(10) Patent No.: US 12,288,878 B2
(45) Date of Patent: Apr. 29, 2025

(54) IONIC LIQUIDS IN LITHIUM ION BATTERIES

(71) Applicant: Oxford University Innovation Limited, Oxford (GB)

(72) Inventors: Mauro Pasta, Oxford (GB); Albert W. Xiao, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 449 days.

(21) Appl. No.: 17/772,532

(22) PCT Filed: Oct. 30, 2020

(86) PCT No.: PCT/GB2020/052748
§ 371 (c)(1),
(2) Date: Apr. 28, 2022

(87) PCT Pub. No.: WO2021/084268
PCT Pub. Date: May 6, 2021

(65) Prior Publication Data
US 2022/0407066 A1    Dec. 22, 2022

(30) Foreign Application Priority Data

Oct. 30, 2019 (GB) .................................. 1915715

(51) Int. Cl.
*H01M 4/58* (2010.01)
*H01M 4/04* (2006.01)
*H01M 4/38* (2006.01)
*H01M 10/0525* (2010.01)
*H01M 10/0569* (2010.01)

(52) U.S. Cl.
CPC ......... *H01M 4/582* (2013.01); *H01M 4/0471* (2013.01); *H01M 4/382* (2013.01); *H01M 10/0525* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

2016/0336598 A1*  11/2016  Yazami ............... H01M 4/1397
2017/0162900 A1    6/2017  Lu et al.
2017/0196997 A1*  7/2017  Sun .................... A61K 49/1836

FOREIGN PATENT DOCUMENTS

CN      103 682 340 A      3/2014
WO      2015/108486 A1    7/2015

OTHER PUBLICATIONS

International Search Report and Written Opinion for WO 2021/084268 (PCT/GB2020/052748), dated Apr. 12, 2021, pp. 1-14.
UK Search Report for GB 1915715.5, dated Jul. 31, 2020, pp. 1-4.

* cited by examiner

*Primary Examiner* — Wyatt P McConnell
(74) *Attorney, Agent, or Firm* — Thomas|Horstemeyer, LLP (57) ABSTRACT

An electrochemical energy storage device is described. The electrochemical energy storage device comprises: a first electrode comprising a transition metal fluoride; a second electrode; and an electrolyte comprising an ionic liquid. An electrode for the electrochemical energy storage device and a method of preparing the electrode are also described.

18 Claims, 9 Drawing Sheets

IONIC LIQUIDS IN LITHIUM ION BATTERIES

CROSS-REFERENCE TO RELATED APPLICATIONS

This application is the National Stage of International Application No. PCT/GB2020/052748, filed Oct. 30, 2020, which claims priority to GB 1915715.5, filed Oct. 30, 2019, which are entirely incorporated herein by reference.

FIELD OF THE INVENTION

The invention relates to an electrochemical energy storage device, such as a battery. The invention also relates to an electrode for the electrochemical energy storage device and to a method for its preparation.

BACKGROUND

Lithium-ion batteries (LIBs) have become the industry standard for electrical energy storage. However, higher energy densities are required to match the ever-increasing performance of consumer electronics, such as mobile phones, portable information devices, laptop computers, camcorders and portable game players, and to provide a power source for electric motors in electric vehicles, hybrid electric vehicles or fuel-cell vehicles. Current intercalation-based electrodes which store lithium at a fraction of interstitial sites within a stable host structure are fundamentally limited in their charge storage capacity.

Transition metal fluorides are unique conversion-based cathode materials, which exhibit high theoretical energy densities. The transition metal fluoride reacts with lithium to form a metallic phase embedded in a lithium fluoride matrix. This conversion reaction involves multiple electrons per metal centre resulting in capacities that are three to five times greater than conventional cathode materials. However, unlike other conversion materials, such as transition metal oxides or sulphides, the highly ionic bonding in transition metal fluorides lowers the chemical potential of the d-electrons through decreased shielding. The larger free energy change on redox translates to a much higher electrode potential—greater than 2.5 V vs. $Li^+/Li$ in most cases—and consequently higher energy density.

Unfortunately, this same ionic nature favouring the use of transition metal fluorides also results in low ionic and electronic conductivities. The conversion reaction, which requires the widespread diffusion of lithium, electrons and transition metal atoms, is difficult to implement in practice.

When transition metal fluorides are used as cathode materials, they often lose capacity over time due to fusing of individual particles and dissolution of the transition metal. Transition metal fluorides typically require large amounts of carbon and complex fabrication methods in order to achieve stable cycling behaviour. As such, the practical energy density of transition metal fluoride batteries is quite low. Additionally, the relatively slow kinetics of the conversion reaction in transition metal fluorides limits the practical charge/discharge rates that can be achieved.

SUMMARY OF THE INVENTION

The invention provides an electrochemical energy storage device, such as a battery. The electrochemical energy storage device comprises: a first electrode comprising a transition metal fluoride; a second electrode; and an electrolyte comprising an ionic liquid.

It has been found that transition metal fluorides react with the molecules of conventional electrolytes to form a layer of decomposition products at the surface of the electrode, a so-called solid-electrolyte interphase (SEI). This SEI layer may be unstable and can participate in side reactions on charge and discharge, which may grow with each cycle to the detriment of the performance of the electrochemical energy storage device. For other types of electrolyte, it has been found that the SEI layer is not well formed leading to the dissolution of the active material into the electrolyte and the subsequent failure of the device.

It has surprisingly been found that an ionic liquid (IL) electrolyte can form an extremely stable solid-electrolyte interphase (SEI) that does not appear to grow over successive cycles or react during charge and discharge. Furthermore, the ionic liquid (IL) electrolyte prevents not only the dissolution, but also the fusing of metal fluorides during cycling, which is another failure mechanism that other types of electrolyte are unable to address.

It has also been found that cycling stability is uncompromised at higher temperatures when using an ionic liquid electrolyte. This allows higher practical charge/discharge rates to be achieved and provides a safer battery system than those based on conventional organic electrolytes. This is due to the negligible vapour pressure, low flammability and high thermal stability of the ionic liquid electrolyte.

The invention further provides a method of preparing an electrode comprising a transition metal fluoride in the form of nanorods. The method comprises: heating a trifluoroacetate salt of a transition metal or a hexafluoroacetylacetonate salt of a transition metal in a solvent comprising a surfactant to a temperature of 250° C. to 350° C. under an inert gas.

The method provides a high yield method for the colloidal synthesis of transition metal fluoride nanorods from a single source precursor. The resulting nanorods are single crystalline, monodisperse and faceted, so that they naturally fall on a high symmetry zone axis. The use of a material having a well-defined morphology as an electrode material is advantageous because it allows the other components of the electrochemical energy storage device to be tailored to the cathode material (e.g. by performing mechanistic studies) to achieve optimal performance. The presence of the nanorods may also aid the general reversibility of systems involving this cathode material.

When the nanorods are used with the ionic liquid (IL) electrolyte, the IL electrolyte precludes major failure mechanisms, preserves the nanorod morphology during cycling, and obviates the use of "strongly coupled" carbon frameworks. The IL electrolyte enables the use of simple slurry cast cathodes with very high active material loadings.

The stable cycling behaviour of the transition metal fluoride cathodes in IL electrolytes is maintained between room temperature and 80° C. At higher temperatures the full theoretical capacity of the transition metal fluoride electrodes can be obtained at higher discharge rates.

The invention also provides an electrode. The electrode comprises a transition metal fluoride in the form of nanorods. The electrode is for an electrochemical energy storage device, such as a battery.

The electrode may be obtained or obtainable from the method of the invention.

The invention also relates to the use of a transition metal fluoride in the form of nanorods in an electrode, preferably a cathode, for an electrochemical energy storage device.

A further aspect of the invention is the use of an electrode comprising a transition metal fluoride in combination with an electrolyte comprising an ionic liquid to (a) form a stable solid-electrolyte interphase (SEI) and/or (b) reduce or prevent degradation of a solid-electrolyte interphase (SEI), in an electrochemical energy storage device.

BRIEF DESCRIPTION OF THE DRAWINGS

The invention is further described hereinafter with reference to the accompanying drawings.

FIG. 10 is a HRTEM image of a single $FeF_2$ nanorod viewed from the end, along the <001> zone axis. The image shows sharp facets on the {110} surfaces and an approximately square cross section. The inset reproduces the corresponding FFT, which shows the single and highly crystalline nature of the nanorods.

FIG. 3B shows that fusing of particles was prevented in the ionic liquid (IL) electrolyte. Insets show high-magnification images of the nanoparticle periphery, an obvious SEI layer was absent from FIG. 3A and was likely removed during sample preparation. The ~10 nm thick surface layer shown in FIG. 3B indicates a lower solubility of the IL-derived SEI in organic electrolytes.

DETAILED DESCRIPTION

The invention provides an electrochemical energy storage device, such as a battery or a capacitor. It is preferred that the electrochemical energy storage device is a battery, such as a lithium-ion battery.

The electrochemical energy storage device comprises a first electrode. The first electrode comprises a transition metal fluoride. The transition metal fluoride is the electrode active material in the first electrode.

The transition metal fluoride is typically a binary compound or a ternary compound comprising two transition metals (e.g. two different transition metals). When the transition metal fluoride is a ternary compound comprising two transition metals, then each transition metal is independently as described hereinbelow.

It is preferred that the transition metal fluoride comprises only a transition metal, more preferably a single transition metal, and fluorine (i.e. as its constituent elements). It may be preferable that the transition metal fluoride is not, for example, a transition metal oxy-fluoride.

The transition metal fluoride may be represented by the following formula:

$$MF_n \qquad (1)$$

where "M" represents a transition metal and "n" is an integer from 1 to 5, such as 1 to 4, preferably 2 to 3.

The term "transition metal" as used herein refers to an element whose atom has a partially filled d sub-shell or which can give rise to cations with an incomplete d sub-shell (as defined by IUPAC).

The integer "n" represents the number of fluorine atoms.

It should be appreciated that oxidation state of the transition metal and the number of fluorine atoms may vary when the first electrode is charged or discharged.

When, for example, a transition metal fluoride is used as a positive electrode with a lithium-containing negative electrode, then it may undergo one of the following conversion reactions.

$$MF_n + Li^+ + e^- \rightarrow MF_{n-1} + LiF \qquad (2)$$

$$MF_n + nLi^+ + ne^- \rightarrow M + nLiF \qquad (3)$$

The transition metal "M" is preferably a first-row transition metal (e.g. from period 4 of the Periodic Table). The transition metal "M" may be a transition metal selected from iron, copper, nickel, cobalt, manganese, chromium, scandium, titanium, vanadium and zinc.

The transition metal "M" is preferably a transition metal selected from iron, copper, nickel, cobalt, manganese, chromium and vanadium. More preferably, the transition metal is selected from iron, cobalt, nickel, manganese and copper. Still more preferably the transition metal is iron. Advantageous electrochemical activity can be obtained when the transition metal is from the first-row of the Period Table, which can be attributed to the mass and electronegativity of the transition metal.

When the transition metal "M" is a first-row transition metal, it is particularly preferable for the integer "n" to be from 2 to 3.

The transition metal fluoride is typically iron (II) fluoride ($FeF_2$), iron (III) fluoride ($FeF_3$), copper (II) fluoride ($CuF_2$), nickel (II) fluoride ($NiF_2$), cobalt (II) fluoride ($CoF_2$), manganese (II) fluoride ($MnF_2$), manganese (III) fluoride ($MnF_3$), chromium (II) fluoride ($CrF_2$), chromium (III) fluoride ($CrF_3$) or a mixture of two or more thereof.

The mixture of two or more thereof is preferably a mixture of at least two transition metal fluorides, where the transition metal of a first transition metal fluoride is different to the transition metal of a second transition metal fluoride. Such mixtures include, for example, a mixture of iron (II) fluoride ($FeF_2$) or iron (III) fluoride ($FeF_3$) and copper (II) fluoride ($CuF_2$); a mixture of iron (II) fluoride ($FeF_2$) or iron (III) fluoride ($FeF_3$) and nickel (II) fluoride ($NiF_2$); a mixture of iron (II) fluoride ($FeF_2$) or iron (III) fluoride ($FeF_3$) and cobalt (II) fluoride ($CoF_2$); a mixture of iron (II) fluoride ($FeF_2$) or iron (III) fluoride ($FeF_3$) and manganese (II) fluoride ($MnF_2$); a mixture of iron (II) fluoride ($FeF_2$) or iron (III) fluoride ($FeF_3$) and manganese (III) fluoride ($MnF_3$); a mixture of iron (II) fluoride ($FeF_2$) or iron (III) fluoride ($FeF_3$) and chromium (II) fluoride ($CrF_2$); a mixture of iron (II) fluoride ($FeF_2$) or iron (III) fluoride ($FeF_3$) and chromium (III) fluoride ($CrF_3$); a mixture of copper (II) fluoride ($CuF_2$) and nickel (II) fluoride ($NiF_2$); a mixture of copper (II) fluoride ($CuF_2$) and, cobalt (II) fluoride ($CoF_2$); a mixture of copper (II) fluoride ($CuF_2$) and manganese (II) fluoride ($MnF_2$) or manganese (III) fluoride ($MnF_3$); a mixture of copper (II) fluoride ($CuF_2$) and chromium (II) fluoride ($CrF_2$) or chromium (III) fluoride ($CrF_3$); a mixture of nickel (II) fluoride ($NiF_2$) and cobalt (II) fluoride ($CoF_2$); a mixture of nickel (II) fluoride ($NiF_2$) and manganese (II) fluoride ($MnF_2$) or manganese (III) fluoride ($MnF_3$); a mixture of nickel (II) fluoride ($NiF_2$) and chromium (II) fluoride ($CrF_2$) or chromium (III) fluoride ($CrF_3$); and a mixture of either (a) manganese (II) fluoride ($MnF_2$) or manganese (III) fluoride ($MnF_3$) and (b) chromium (II) fluoride ($CrF_2$) or chromium (III) fluoride ($CrF_3$).

It is preferred that the transition metal fluoride is iron (II) fluoride ($FeF_2$). When there is a mixture of two or more transition metal fluorides, then preferably one of the transition metal fluorides is iron (II) fluoride ($FeF_2$).

The first electrode may be an electrode of the invention in the form of nanorods, as described herein below.

The electrochemical energy storage device comprises an electrolyte. The electrolyte is typically in contact with the first electrode and the second electrode.

The electrolyte comprises an ionic liquid (IL). Thus, for example, the amount of ionic liquid is from 50 to 95% by weight of the electrolyte, preferably at least 55 to 90% by weight of the electrolyte, more preferably at least 60 to 85% by weight of the electrolyte.

It is preferred that the electrolyte comprises, or consists essentially of, a non-aqueous IL.

When an ionic liquid (IL) electrolyte is used in combination with an electrode comprising a transition metal fluoride, an extremely stable solid-electrolyte interphase (SEI) can be formed that does not appear to grow over successive cycles or react during charge and discharge. The ionic liquid (IL) electrolyte prevents fusing of the transition metal fluoride in the electrode during cycling.

In general, the ionic liquid comprises an anion and a cation.

The cation may comprise a tetravalent nitrogen cation. It has been found that when the cation of the ionic liquid comprises a tetravalent nitrogen cation, such as described below, the nitrogen-containing groups can be incorporated into the SEI.

In general, it is preferred that the cation does not have an alkoxyalkyl group. Thus, the tetravalent nitrogen cation preferably does not comprise alkoxyalkyl group as a substituent.

The cation is typically a quaternary ammonium cation, an imidazolium cation, a pyridinium cation, a piperidinium cation, a pyrrolidinium cation, a pyrrolinium cation, an isoquinolinium cation, a triazolium cation or a pyrazolium cation. Thus, the ionic liquid comprises a quaternary ammonium cation, an imidazolium cation, a pyridinium cation, a piperidinium cation, a pyrrolidinium cation, a pyrrolinium cation, an isoquinolinium cation, a triazolium cation or a pyrazolium cation.

The quaternary ammonium cation is preferably quaternary alkyl ammonium cation (e.g. $R_4N^+$, where R is an alkyl group). The imidazolium cation is preferably di-alkyl imidazolium cation (e.g. alkyl groups at the 1,3-positions [i.e. the nitrogen atoms] of the imidazolium ring). The pyridinium cation is preferably an alkyl pyridinium cation (e.g. an alkyl group at the 1-position [i.e. the nitrogen atom] of the pyridinium ring). The piperidinium cation is preferably a di-alkyl piperidinium cation (e.g. alkyl groups at the 1-position [i.e. the nitrogen atom] of the piperidinium ring). The pyrrolidinium cation is preferably a di-alkyl pyrrolidinium cation (e.g. alkyl groups at the 1-position [i.e. the nitrogen atom] of the pyrrolidinium ring). The pyrrolinium cation is preferably a di-alkyl pyrrolinium cation (e.g. alkyl groups at the 1-position [i.e. the nitrogen atom] of the pyrrolinium ring). The isoquinolinium cation is preferably an alkyl isoquinolinium cation (e.g. an alkyl group at the 2-position [i.e. the nitrogen atom] of the isoquinolinium ring). The triazolium cation is preferably a di-alkyl triazolium cation (e.g. alkyl groups at the 1,3-positions [i.e. the nitrogen atoms] of the triazolium ring). The pyrazolium cation is preferably a di-alkyl pyrazolium cation (e.g. alkyl groups at the 1,2-positions [i.e. the nitrogen atoms] of the pyrazolium ring).

For each of the quaternary alkyl ammonium cation, the di-alkyl imidazolium cation, the alkyl pyridinium cation, the di-alkyl piperidinium cation, the di-alkyl pyrrolidinium cation, the di-alkyl pyrrolinium cation, the alkyl isoquinolinium cation, the di-alkyl triazolium cation and the di-alkyl pyrazolium cation, each alkyl group may be the same or different and is independently a $C_1$-$C_8$ alkyl group.

The term "alkyl" as used herein refers to a straight or branched hydrocarbon chain radical consisting of carbon and hydrogen atoms, and containing no unsaturation. The alkyl group may be a $C_1$-$C_8$ alkyl group, preferably a $C_1$-$C_6$ alkyl group and more preferably a $C_1$-$C_4$ alkyl group. A "$C_1$-$C_8$ alkyl" group, for example, contains one to eight carbon atoms, such as methyl, ethyl, propyl, isopropyl, butyl, pentyl, and hexyl. In general, it is preferred that each alkyl group is not substituted with an alkoxy group (e.g. alkyl-oxy group). More preferably, each alkyl group is unsubstituted.

Examples of a quaternary alkyl ammonium cation include tetraethyl ammonium cation (($C_2H_5$)$_4$N$^+$), tetrapropyl ammonium cation (($C_3H_7$)$_4$N$^+$), tetrabutyl ammonium cation (($C_4H_9$)$_4$N$^+$), tetraoctyl ammonium cation (($C_8H_{17}$)$_4$N$^+$), triethyl methyl ammonium cation (($C_2H_5$)$_3$(CH$_3$)N$^+$), tributyl methyl ammonium cation (($C_4H_9$)$_3$(CH$_3$)N$^+$), trioctyl methyl ammonium cation (($C_8H_{17}$)$_3$(CH$_3$)N$^+$), trimethyl propyl ammonium cation ((CH$_3$)$_3$(C$_3$F$_{17}$)N$^+$, TMPA) and diethyl dimethyl ammonium cation (($C_2H_5$)$_2$(CH$_3$)$_2$N$^+$).

Examples of a di-alkyl imidazolium cation include 1,3-dimethylimidazolium cation, 1-butyl-3-methylimidazolium cation, 1-ethyl-3-methylimidazolium cation, 1-hexyl-3-methylimidazolium cation, 1-octyl-3-methylimidazolium, 3-methyl-1-propylimidazolium Examples of an alkyl pyridinium cation include 1-methylpyridinium cation, 1-ethylpyridinium cation, 1-propylpyridinium cation, 1-butylpyridinium cation and 1-butyl-4-methylpyridinium cation.

Examples of a di-alkyl piperidinium cation include N-butyl-N-methylpiperidinium cation and N-propyl-N-methylpiperidinium cation.

Examples of a di-alkyl pyrrolidinium cation include N-butyl-N-methylpyrrolidinium cation, N-methyl-N-(2-methoxyethyl)pyrrolidinium cation, N-methyl-N-octylpyrrolidinium and N-methyl-N-pentylpyrrolidinium.

It is preferred that the cation is a quaternary-($C_1$-$C_8$ alkyl) ammonium cation, a di-($C_1$-$C_8$ alkyl) imidazolium cation, a $C_1$-$C_8$ alkyl pyridinium cation, a di-($C_1$-$C_8$ alkyl) piperidinium cation or a di-($C_1$-$C_8$ alkyl) pyrrolidinium cation. More preferably, the cation is a di-($C_1$-$C_8$ alkyl) imidazolium cation, a $C_1$-$C_8$ alkyl pyridinium cation or a di-($C_1$-$C_8$ alkyl) pyrrolidinium cation. Even more preferably, the cation is di-($C_1$-$C_8$ alkyl) pyrrolidinium cation, particularly a N-methyl-N-propyl pyrrolidinium cation.

The anion may be an anion comprising a fluorosulfonylimide moiety (NSO$_2$F), a fluoroalkylsulfonylimide moiety, or a fluoroalkylsulfonate anion. The fluoroalkylsulfonylimide moiety is typically a ($C_1$-$C_8$ fluoroalkyl) sulfonylimide moiety. The fluoroalkylsulfonate anion is typically a ($C_1$-$C_8$ fluoroalkyl)sulfonate anion.

It has been found that when anion of the ionic liquid comprises a sulfonyl or sulfonate moiety, such as described below, that the sulfur-containing groups can be incorporated into the SEI. These anions are also resistant.

The term "fluoroalkyl" as used herein refers to an alkyl group or radical as defined above that is substituted by one or more fluoro groups. The fluoroalkyl group may be a $C_1$-$C_8$ fluoroalkyl group, preferably a $C_1$-$C_6$ fluoroalkyl group and more preferably a $C_1$-$C_4$ fluoroalkyl group. A "$C_1$-$C_8$ fluoroalkyl" group, for example, contains one to eight carbon atoms, such as, such as, for example, trifluoromethyl, difluoromethyl, fluoromethyl, 2,2,2-trifluoroethyl, 1-fluoromethyl or 2-fluoroethyl. Each fluoroalkyl group (e.g. $C_1$-$C_8$ fluoroalkyl" group etc) is typically unsubstituted.

An example of an anion comprising a fluorosulfonylimide moiety is a bis(fluorosulfonyl)imide anion (FSI).

Examples of an anion comprising a fluoroalkylsulfonylimide moiety include bis[(trifluoromethyl)sulfonyl]imide (TFSI), bis[(pentafluoroethyl)sulfonyl]imide (BETI), 2,2,2-trifluoromethylsulfonyl-N-cyanoamide (TFSAM) and 2,2,2-trifluoro-N-(trifluoromethylsulfonyl) acetamide (TSAC).

An example of an anion comprising a fluoroalkylsulfonate anion is trifluoromethanesulfonate.

In general, the anion comprising a fluorosulfonylimide moiety (NSO$_2$F) is a bisfluoroalkylsulfonylimide moiety, such as a bis-(($C_1$-$C_8$ fluoroalkyl)sulfonyl)imide anion.

It is preferred that the anion is bis(fluorosulfonyl)imide (FSI) or a bis-(($C_1$-$C_8$ fluoroalkyl)sulfonyl)imide anion. More preferably, the anion is a bis(fluorosulfonyl)imide (FSI).

When the anion is a bis-(($C_1$-$C_8$ fluoroalkyl)-sulfonyl) imide anion, then it is preferred that the anion is the bis(trifluoromethanesulfonyl)imide (TFSI) anion. Thus, the ionic liquid may comprise a bis(fluorosulfonyl)imide (FSI) anion or a bis(trifluoromethanesulfonyl)imide (TFSI) anion. More preferably, the anion is a bis(fluorosulfonyl)imide (FSI) anion.

The ionic liquid preferably comprises a di-($C_1$-$C_8$ alkyl) pyrrolidinium cation (e.g. N-methyl-N-propyl pyrrolidinium cation) and either bis(fluorosulfonyl)imide (FSI) or a bis-(($C_1$-$C_8$ fluoroalkyl)-sulfonyl)imide anion. More preferably, the ionic liquid preferably comprises a di-($C_1$-$C_8$ alkyl) pyrrolidinium cation (e.g. N-methyl-N-propyl pyrrolidinium cation) and a bis(fluorosulfonyl)imide (FSI). Even more preferably, the ionic liquid comprises a N-methyl-N-propyl pyrrolidinium cation and a bis(fluorosulfonyl)imide (FSI) anion.

Typically, the ionic liquid has a dynamic viscosity of 10 to 150 mPa·s at a temperature of 25° C., preferably 20 to 100 mPa·s at a temperature of 25° C.

Generally, the electrolyte and/or the ionic liquid may have an ionic conductivity between 0.1 and 50 mS/cm at 25° C., preferably at least 1 mS/cm 25° C.

The electrolyte may further comprise a lithium salt. Thus, the electrolyte may comprise, or consists essentially of, the ionic liquid and the lithium salt.

The lithium salt has an anion and may, for example, be represented by the formula LiX, where X represents the anion.

The anion of the lithium salt may be an anion as described above for the ionic liquid, such as a ($C_1$-$C_8$ fluoroalkyl) sulfonate anion, a bis(fluorosulfonyl)imide anion (FSI) or a bis-(($C_1$-$C_8$ fluoroalkyl)sulfonyl)imide anion. It is preferred that the anion of the lithium salt is a bis(fluorosulfonyl)imide anion (FSI) or a bis-(($C_1$-$C_8$ fluoroalkyl)sulfonyl)imide anion (e.g. bis(trifluoromethanesulfonyl)imide (TFSI) anion). More preferably, the anion of the lithium salt is a bis(fluorosulfonyl)imide (FSI) anion (e.g. the electrolyte comprises LiFSI).

Typically, the anion of the lithium salt is the same as the anion of the ionic liquid.

The electrolyte may comprise the lithium salt in an amount of 5% to 50% by weight (e.g. by weight of the electrolyte), preferably 10% to 40% by weight, and more preferably 15 to 30% by weight.

The electrolyte may or may not comprise a solvent, such as an organic solvent. The organic solvent may be a cyclic carbonate (e.g. propylene carbonate (PC), ethylene carbonate (EC), butylene carbonate (BC), vinylene carbonate (VC), vinyl ethylene carbonate (VEC), fluoroethylene carbonate (FEC)); a chain carbonate (e.g. dimethyl carbonate (DMC), ethyl methyl carbonate (EMC), diethyl carbonate (DEC), methyl propyl carbonate (MPuC), methyl butyl carbonate (MBC), methyl pentyl carbonate (MPeC)); a chain ether (e.g. diethyl ether (DEEt), methyl butyl ether (MBE), 1,2-dimethoxyethane (DME), 1-methoxy-2-ethoxyethane (EME), 1,2-diethoxyethane (DEE)); a cyclic ester (e.g. γ-butyrolactone (GBL), α-methyl-γ-butyrolactone (MGBL), γ-valerolactone (GVL), furanone (FL), 3-methyl-2(5H)-furanone (MFL)) or a cyclic ether (e.g. tetrahydrofuran (THF), 2-methyltetrahydrofuran (MTHF), 2,5-dimethyltetrahydrofuran (dMTHF), 1,3-dioxolan (DIOX), 2-methyl-1,3-dioxolan (MDIOX), tetrahydropyran (THP), 2-methyltetrahydropyran (MTHP)). It is preferred that the electrolyte does not comprise an organic solvent. This is to minimise the flammability of the electrochemical energy storage device.

The electrochemical energy storage device of the invention comprises a second electrode. In principle, any type of second electrode may be used in the electrochemical energy storage device, particularly a second electrode comprising lithium.

The second electrode has a different composition to the composition of the first electrode. This is to ensure that there an electrical potential difference can exist between the first electrode and the second electrode.

In general, the first electrode is a cathode and the second electrode is an anode.

Typically, the second electrode or anode comprises lithium.

The second electrode or anode comprising lithium may comprise a lithium metal electrode or an alloy of lithium with silicon.

It is preferred that the second electrode is a lithium metal electrode. When a lithium metal electrode is used, then high energy densities can be obtained. The lithium metal electrode may also be stable in the electrolyte used in the invention.

In general, the first electrode and the second electrode may each independently comprise a binder, such as a polymeric binder (e.g. a polyimide, polyvinylidene fluoride).

The electrochemical energy storage device typically comprises a separator. This separates the first electrode and the second electrode. The separator is located between the first electrode and the second electrode. The separator is electrically insulating.

Separators are known in the art. The separator functions as a physical barrier between the first electrode (e.g. cathode) and the second electrode (e.g. anode), and allows ions to flow between these electrodes. Separators are typically porous structures that are ion-permeable, but not electrically conductive.

The electrochemical energy storage device may have a casing. The casing may provide a protective enclosure.

The electrochemical energy storage device may include a charger, as part of a system. The charger has the function of recharging the electrochemical energy storage device, especially when it is a battery.

The invention also provides an electrode. The electrode comprises a transition metal fluoride in the form of nanorods.

The transition metal fluoride is as described above for the first electrode.

Thus, the transition metal fluoride may be represented by the formula (1) above, where "M" represents a transition metal and "n" is an integer from 1 to 5, such as 1 to 4, preferably 2 to 3.

The transition metal "M" is preferably a first-row transition metal (e.g. from period 4 of the Periodic Table). More preferably, the transition metal "M" is a transition metal selected from iron, copper, nickel, cobalt, manganese, chromium and vanadium. When the transition metal "M" is a first-row transition metal, it is particularly preferable for the integer "n" to be from 2 to 5.

The transition metal fluoride is typically iron (II) fluoride ($FeF_2$), iron (III) fluoride ($FeF_3$), copper (II) fluoride ($CuF_2$), nickel (II) fluoride ($NiF_2$), cobalt (II) fluoride ($CoF_2$), manganese (II) fluoride ($MnF_2$), manganese (III) fluoride ($MnF_3$), chromium (II) fluoride ($CrF_2$), chromium (III) fluoride ($CrF_3$) or a mixture of two or more thereof.

The mixture of two or more thereof is preferably a mixture of at least two transition metal fluorides, where the transition metal of a first transition metal fluoride is different to the transition metal of a second transition metal fluoride. Such mixtures include, for example, a mixture of iron (II) fluoride ($FeF_2$) or iron (III) fluoride ($FeF_3$) and copper (II) fluoride ($CuF_2$); a mixture of iron (II) fluoride ($FeF_2$) or iron (III) fluoride ($FeF_3$) and nickel (II) fluoride ($NiF_2$); a mixture of iron (II) fluoride ($FeF_2$) or iron (III) fluoride ($FeF_3$) and cobalt (II) fluoride ($CoF_2$); a mixture of iron (II) fluoride ($FeF_2$) or iron (III) fluoride ($FeF_3$) and manganese (II) fluoride ($MnF_2$); a mixture of iron (II) fluoride ($FeF_2$) or iron (III) fluoride ($FeF_3$) and manganese (III) fluoride ($MnF_3$); a mixture of iron (II) fluoride ($FeF_2$) or iron (III) fluoride ($FeF_3$) and chromium (II) fluoride ($CrF_2$); a mixture of iron (II) fluoride ($FeF_2$) or iron (III) fluoride ($FeF_3$) and chromium (III) fluoride ($CrF_3$); a mixture of copper (II) fluoride ($CuF_2$) and nickel (II) fluoride ($NiF_2$); a mixture of copper (II) fluoride ($CuF_2$) and, cobalt (II) fluoride ($CoF_2$); a mixture of copper (II) fluoride ($CuF_2$) and manganese (II) fluoride ($MnF_2$) or manganese (III) fluoride ($MnF_3$); a mixture of copper (II) fluoride ($CuF_2$) and chromium (II) fluoride ($CrF_2$) or chromium (III) fluoride ($CrF_3$); a mixture of nickel (II) fluoride ($NiF_2$) and cobalt (II) fluoride ($CoF_2$); a mixture of nickel (II) fluoride ($NiF_2$) and manganese (II) fluoride ($MnF_2$) or manganese (III) fluoride ($MnF_3$); a mixture of nickel (II) fluoride ($NiF_2$) and chromium (II) fluoride ($CrF_2$) or chromium (III) fluoride ($CrF_3$); and a mixture of either (a) manganese (II) fluoride ($MnF_2$) or manganese (III) fluoride ($MnF_3$) and (b) chromium (II) fluoride ($CrF_2$) or chromium (III) fluoride ($CrF_3$).

It is preferred that the transition metal fluoride is iron (II) fluoride ($FeF_2$). When there is a mixture of two or more transition metal fluorides, then preferably one of the transition metal fluorides is iron (II) fluoride ($FeF_2$).

The transition metal fluoride is in the form of nanorods. In other words, particles of the transition metal fluoride are nanorod-shaped.

The term "nanorod" as used herein refers to an object (e.g. a particle of the transition metal fluoride) having an aspect ratio of from 2 to 10, preferably 2 to 5, and a length of 100 nm, preferably 40 nm. The "aspect ratio" refers to the length divided the width of the nanorod. The length is the longest dimension of the nanorod. The width is largest straight-line dimension in a transverse cross-section of the nanorod. Thus, for example, when the nanorod has a circular cross-section, then the width is the diameter of the circle. When the nanorod has a square cross-section, then then width is the length of the diagonal of the square. All dimensions of the nanorod can be measured using transmission electron microscopy (TEM) at a suitable resolution.

The nanorods may have a mean length of 50 to 200 nm, preferably 75 to 175 nm, and more preferably 100 to 150 nm. The mean length can be determined by taking a sample of the nanorods, measuring the lengths of these nanorods using TEM and then calculating the mean length from the measurements.

The mean length of the nanorods may have a standard deviation of ±50 nm, preferably ±25 nm, and more preferably ±10 nm.

Typically, the nanorods have a square, rectangular, circular or elliptical shaped cross-section. When the nanorods have a square or rectangular shaped cross-section, then the corners of the square or rectangle may be truncated or rounded corners. The nanorods may, for example, have a squircle shaped cross-section.

The nanorods may have a mean width of 5 to 40 nm, preferably 10 to 30 nm, and more preferably 15 to 25 nm. The mean width of the nanorods can be measured in the same way as the mean length.

The mean width of the nanorods may have a standard deviation of ±5 nm, preferably ±2.5 nm, and more preferably ±1.0 nm.

The nanorods may be monodispersed.

The nanorods are typically crystalline, preferably single crystalline. Thus, the nanorods comprise, or consist essentially of, the crystalline transition metal fluoride.

The electrode may comprise at least 50% by weight (e.g. of the electrode) of the transition metal fluoride in the form of nanorods, preferably at least 70% by weight, more preferably at least 80% by weight.

The electrode may further comprise a binder, such as a polymeric binder. The polymeric binder may, for example, be a polyimide, a polyvinylidene fluoride or an ethylene propylene diene monomer rubber. It is preferred that the polymeric binder is a polyvinylidene fluoride.

The electrode may also comprise a conductive additive. The conductive additive may be carbon black, activated carbon, graphene or graphite. It is preferred that the conductive additive is carbon black.

The invention also provides a method of preparing an electrode comprising a transition metal fluoride in the form of nanorods.

The method may comprise a single step. Advantageously, the method is a convenient one-pot method that provides good yields of transition metal fluoride in the form of nanorods.

In general, the method includes a step of heating a trifluoroacetate salt of a transition metal or a hexafluoroacetylacetonate salt of a transition metal in a solvent comprising a surfactant to a temperature of 250° C. to 350° C. under an inert gas. It is preferred that the temperature is 260° C. to 350° C., such as 260° C. to 320° C. It may be preferably that the temperature is less than 320° C., such as 250° C. to 310° C.

The inert gas is substantially free of oxygen, preferably oxygen and water. The term "substantially free" in this context refers to the purity of the inert gas, which is typically at least 99.9% (e.g. total impurities ≤1000 ppm), preferably at least 99.99% (e.g. total impurities ≤100 vpm), more preferably at least 99.999% (e.g. total impurities ≤10 vpm), and even more preferably at least 99.9999% (e.g. total impurities ≤1 vpm).

The inert gas may nitrogen ($N_2$) or argon (Ar).

The transition metal is preferably a first-row transition metal (e.g. from period 4 of the Periodic Table). More preferably, the transition metal is selected from iron, copper, nickel, cobalt, manganese, chromium and vanadium. Even more preferably, the transition metal is selected from iron, cobalt, nickel, manganese and copper. Still more preferably the transition metal is iron.

The trifluoroacetate salt of the transition metal may be iron (II) trifluoroacetate, iron (III) trifluoroacetate, cobalt (II) trifluoroacetate, nickel (II) trifluoroacetate, copper (II) trifluoroacetate or manganese (II) trifluoroacetate. The trifluoroacetate salt is preferably iron (II) trifluoroacetate.

The hexafluoroacetylacetonate salt of a transition metal may be iron (II) hexafluoroacetylacetonate, iron (III) hexafluoroacetylacetonate, cobalt (II) hexafluoroacetylacetonate, nickel (II) hexafluoroacetylacetonate, copper (II) hexafluoroacetylacetonate or manganese (II) hexafluoroacetylacetonate.

The solvent is typically an aprotic solvent, preferably a non-polar aprotic solvent.

The solvent may be an alkane, an alkene or an ether.

When the solvent is an alkane, an alkene or an ether, then the alkane, alkene or either has a boiling point of at least 250° C. at standard atmospheric pressure (e.g. 1,013.25 mbar), preferably at least 300° C. at standard atmospheric pressure, and more preferably at least 315° C. at standard atmospheric pressure.

The solvent is typically 1-octadecene, 1-eicosene, 1-docosene, octadecane, eicosane, docosane, benzyl ether or octyl ether. It is preferred that the solvent is 1-octadecene.

The surfactant may be a cationic surfactant, an anionic surfactant, a non-ionic surfactant or a mixture thereof. The surfactant may be a mixture of a cationic surfactant and an anionic surfactant or a mixture of a non-ionic surfactant and an anionic surfactant.

The anionic surfactant is typically a carboxylate anionic surfactant or the conjugate acid thereof, such as the anion of a fatty acid surfactant or the fatty acid surfactant. For example, the carboxylate anionic surfactant or conjugate acid thereof may be oleate (e.g. anion of oleic acid) or oleic acid; or octadecenoate or octadecanoic acid.

The cationic surfactant is typically an ammonium cation surfactant or a conjugate base thereof. For example, the ammonium cation surfactant or the conjugate base thereof may be oleyl ammonium or oleyl amine; or octadecyl ammonium or octadecyl amine.

The non-ionic surfactant may comprise a carboxylic acid group, an amine group, a phosphine group or a phosphine oxide group.

For the avoidance of doubt, the expression "consists essentially of" as used herein limits the scope of a feature to include the specified materials, and any other materials or steps that do not materially affect the basic and novel characteristics of that feature, such as, for example, minor impurities. The expression "consists essentially of" embraces the expression "consisting of".

Examples

Preparative Methods and Characterization Details
Colloidal Synthesis of $FeF_2$ Nanorods Trifluoroacetic acid (99%), trifluoroacetic anhydride (99%+), 1-octadecene (ODE, technical grade, 90%), ethanol (absolute), Iron(II) chloride (98%), oleic acid (OLAC, technical grade, 90%), oleylamine (OLAM, technical grade, 90%), n-hexane (anhydrous, 95%), and chloroform (anhydrous, 99%) were used. Ethanol was dried over calcium sulfate, filtered and stored over molecular sieves before use. All other chemicals were used as received.

Iron(II) trifluoroacetate, $Fe(CF_3COO^-)_2(CF_3COOH)_2$, was employed as the single source Fe, F precursor in the colloidal synthesis of $FeF_2$ nanorods. Iron(II) trifluoroacetate was prepared using a method modified from that developed by C. P. Guntlin et al.; "*Transition metal trifluoroacetates (M=Fe, Co, Mn) as precursors for uniform colloidal metal difluoride and phosphide nanoparticles.*"; Scientific Reports 9 (2019), 1-10. Briefly, 3.5 g of iron(II) chloride and 40 ml of trifluoroacetic acid were loaded into a 50 ml Erlenmeyer flask, attached to a Schlenk line via a water-cooled condenser and heated to reflux on a hotplate under nitrogen flow with magnetic stirring for 24 h. Excess trifluoroacetic acid was evaporated under vacuum until a slushy, light brown mixture was obtained; the mixture was then washed three times with 10 ml portions of 5% trifluoroacetic anhydride in anhydrous hexane (v/v) followed by centrifugation. The resultant off-white, crystalline powder was dried under vacuum and transferred to an argon-filled glovebox.

In a typical $FeF_2$ nanorod synthesis in accordance with the invention, 1530 mg of the iron(II) trifluoroacetate (3 mmol) was transferred under argon to a 250 ml three-neck, round bottom flask attached to a Schlenk line. 16 ml of oleic acid, 16 ml of oleylamine, and 28 ml of 1-octadecene were loaded into the flask along with a magnetic stir bar, resulting in a dark red solution. The flask was equipped with an immersion type thermocouple and a PID-controlled heating mantle and sealed with a ground-glass stopper. The reaction mixture was flushed under vacuum for (5 min) and purged under nitrogen (1 min) three times at room temperature and subsequently degassed under vacuum at 100° C. for 15 min. The flask was then heated to 310° C. (~14° C./min) resulting in a color change from dark red to clear yellow and allowed to react for 2 h. The reaction mixture was slowly cooled to room temperature, transferred to a centrifuge tube and washed 3 times by dispersion in anhydrous hexane followed by precipitation with dried ethanol and centrifugation. The washed pellet (260 mg) was redispersed and stored in anhydrous hexane resulting in a pale yellow dispersion.

Electrochemical Characterization $FeF_2$ nanorod electrodes were fabricated using a conventional tape casting method. The as-synthesized $FeF_2$ nanorods were co-dispersed with a suspension of Super-P™ carbon black (from Fisher Scientific™) in anhydrous chloroform, dried under vacuum and hand ground with additional Super-P™ before mixing with polyvinylidene fluoride (PVDF) and N-methyl pyrrolidone (NMP). The resulting slurry (7:2:1 $FeF_2$:Super-P™:PVDF by mass) was cast via doctor blade on aluminum foil, allowed to dry and placed under vacuum for 24 h before being punched into circular electrodes (diameter 1 cm).

Galvanostatic cycling tests were conducted in an oven at temperatures ranging from 30° C. to 80° C. between 4.0 and 1.2V in a 2032 coin cell format using a Biologic BCS-805 battery cycler. Electrochemical impedance spectroscopy was performed in conjunction with galvanostatic cycling using 3-electrode Swagelok type cell and a Biologic VMP3 potentiostat. Impedance spectra in the frequency range 50 mHz to 200 kHz were acquired using a 10 mV amplitude, following a 1 h rest period after each discharge/charge half cycle (C/20 rate). All cells were assembled in an argon-filled glovebox using glass fiber separators (Whatman™, GF/D) and metallic lithium foil (Sigma™ 99.9%) as the counter/reference electrodes. The ionic liquid (IL) electrolyte was prepared from LiFSI (TCI, >98%) and dried N-methyl-N-propyl pyrrolidinium fluorosulfonylimide ($Pyr_{1,3}FSI$) (99.5%, from Solvionic™) in a glovebox. 1M $LiPF_6$/ethylene carbonate:dimethyl carbonate (LP30) was obtained from Sigma-Aldrich™.

Results and Discussion

Electrochemical Characterization

Figure 2A:
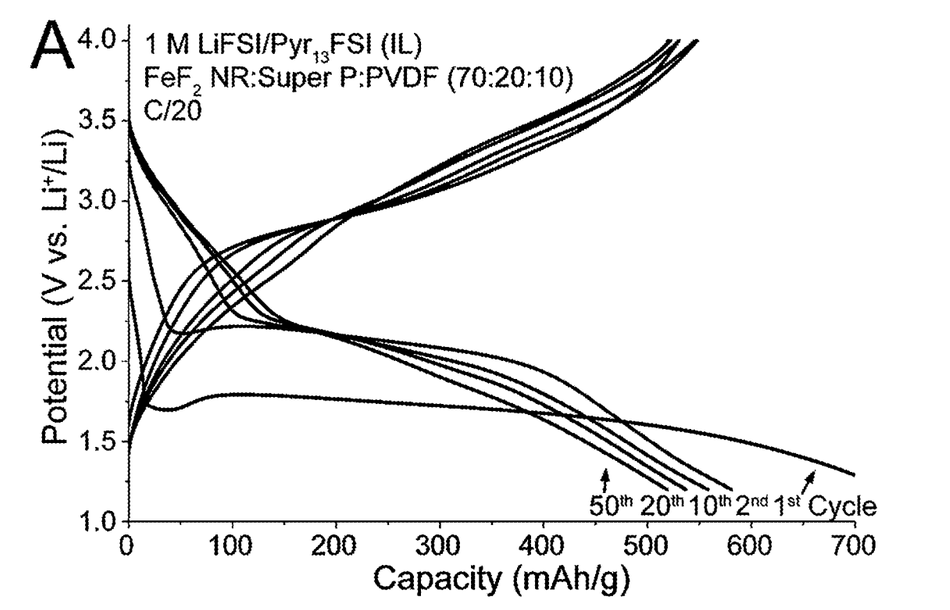
FIG. 2A shows the Galvanostatic discharge/charge profiles for various cycles of an $FeF_2$ nanorod coin cell.
Figure 2B:
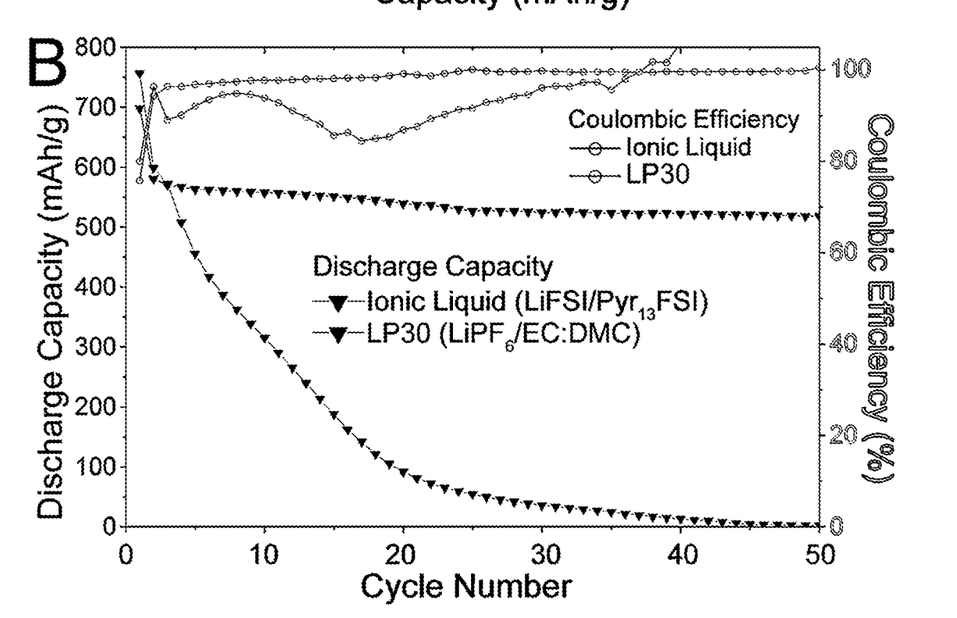
FIG. 2B is a graph with plots of discharge capacity and coulombic efficiency vs. cycle number comparing the performance of $FeF_2$ nanorod electrodes between the conventional LP30 electrolyte and an ionic liquid electrolyte. In the ionic liquid, more than 90% of the theoretical capacity was maintained after 50 cycles.

The LiFSI/$Pyr_{1,3}$FSI ionic liquid (IL) electrolyte enables exceptionally stable cycling without excessive amounts of obfuscating carbon (FIGS. 2A and 2B). This advance allows for accurate observation of the intrinsic electrochemical behaviour responsible for reversibility in $FeF_2$ as well as the implementation of metal fluorides in a truly energy dense format. $FeF_2$ was found to exhibit a high discharge rate capability. The galvanostatic profile of the $FeF_2$ electrodes (FIG. 2A) shows 24% irreversible capacity on the first discharge due to initial formation of the SEI layer. The coulombic efficiency increases immediately on the second cycle, exceeding 99% within the first 15 cycles (FIG. 2B). In contrast, electrodes cycled in the conventional 1M $LiPF_6$/ethylene carbonate:dimethyl carbonate (LP30) electrolyte exhibit low coulombic efficiency and approach zero capacity within the first 40 cycles (FIG. 2B). The ionic liquid system exhibits a hysteresis of 0.6V (C/20), comparable to the lowest values in the literature. On the other hand, the LP30 system exhibits a hysteresis of 0.8V, which increases to >1.0V after several cycles. At higher temperatures in the ionic liquid electrolyte, the $FeF_2$ electrodes exhibit similar cycling stability but a markedly improved capacity at cycling rates between C/10 and 1 C.

Figure 2C:
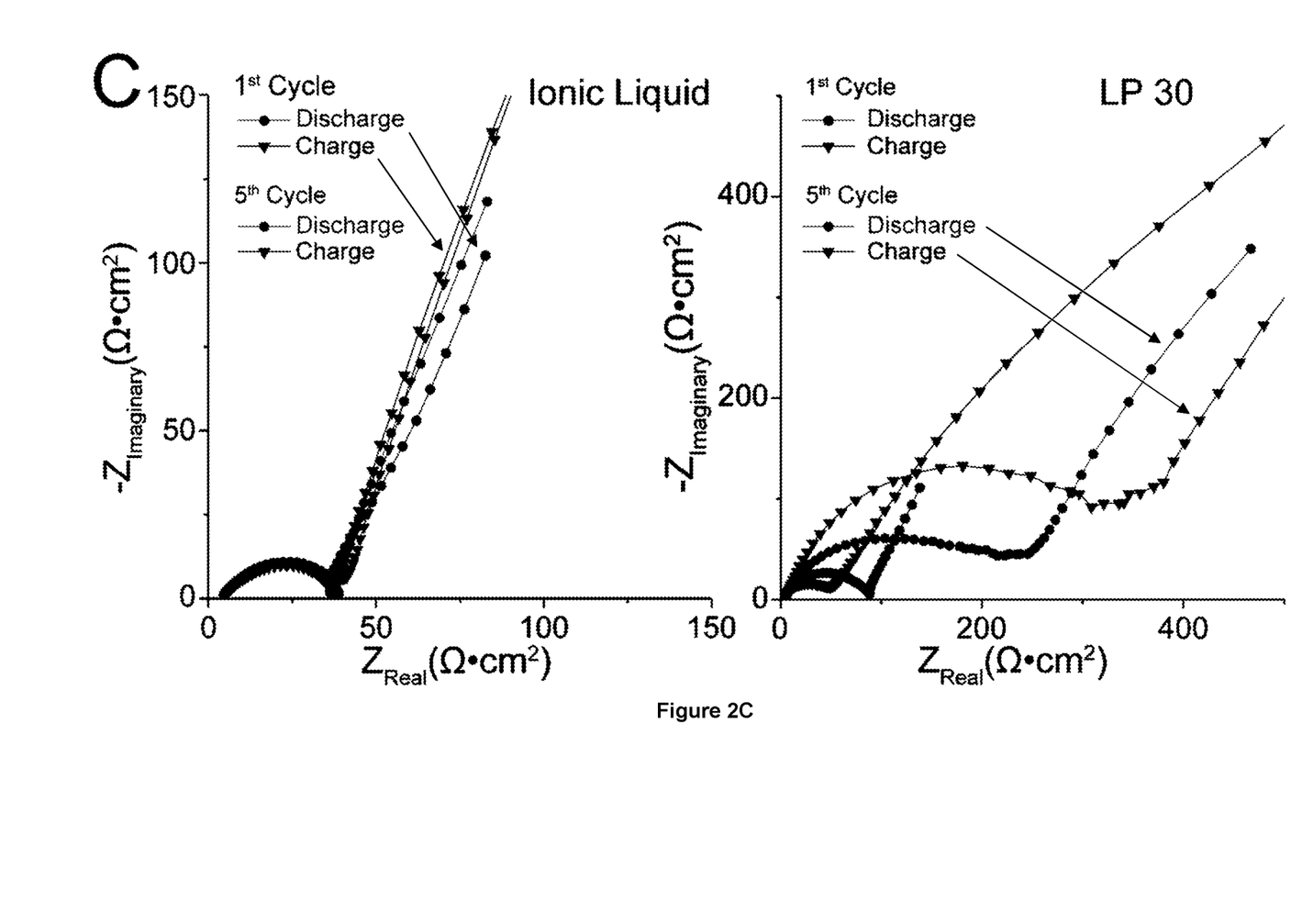
FIG. 2C shows Nyquist impedance plots for the $FeF_2$ nanorod electrodes, demonstrating the difference in stability between the ionic liquid electrolyte (left) and the LP30 electrolyte (right). Data from the first and fifth cycles were plotted to demonstrate the long-term effects of cycling; charge transfer resistance increased markedly with each cycle in the LP30, suggesting a thickening SEI layer. Impedance spectra were collected directly after the discharge and charge processes for each cycle and indicated that the LP30 derived SEI layer exhibits significant redox activity.

Electrochemical impedance spectroscopy (EIS) (FIG. 2C) reveals virtually no increase in charge transfer resistance after five cycles in IL, which is consistent with the stable cycling observed immediately after the first discharge. This stability is remarkable, even compared to the best electrolyte systems described previously. Conversely, the LP30 system exhibits a higher initial charge transfer resistance that increases by a factor of three over the first five cycles; this can be attributed to a progressively thickening SEI layer. Additionally, in LP30 the charge transfer resistance fluctuates significantly between discharge and charge (FIG. 2C). This is possibly related to the repetitive formation and partial dissolution of the SEI layer as corroborated by x-ray photoelectron spectroscopy (XPS).

Figure 3A:
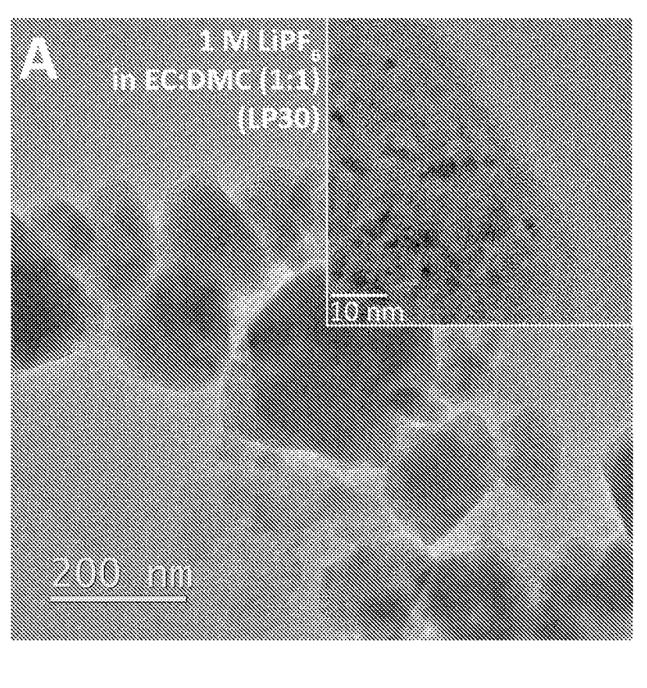
FIGS. 3A and 3B are ex-situ TEM micrographs of $FeF_2$ nanorods after a single discharge in LP30 (A) and ionic liquid (B) electrolytes. The exclusive presence of large irregular particles in (A) showcases a major failure mechanism in the fusing of adjacent nanorods.
Figure 3B:
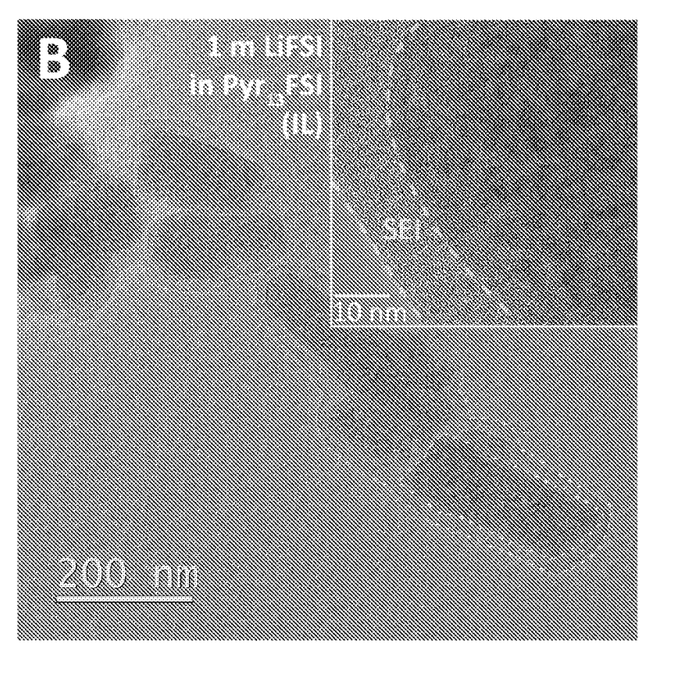
Figure 3C:
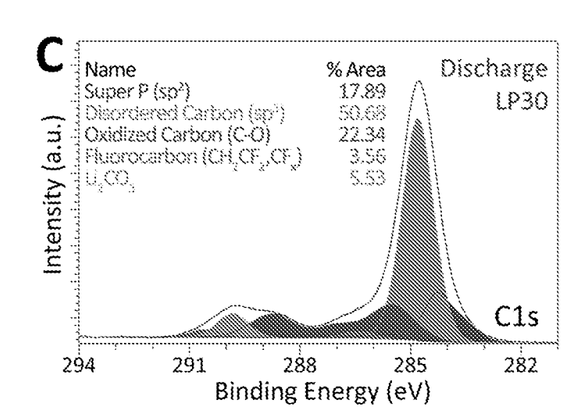
FIGS. 3C and 3E show C1s XPS spectra of $FeF_2$ nanorod electrodes cycled in LP30 electrolyte, demonstrating the formation of a significant aliphatic layer on discharge (FIG. 3C) and its dissolution on charge (FIG. 3E).
Figure 3D:
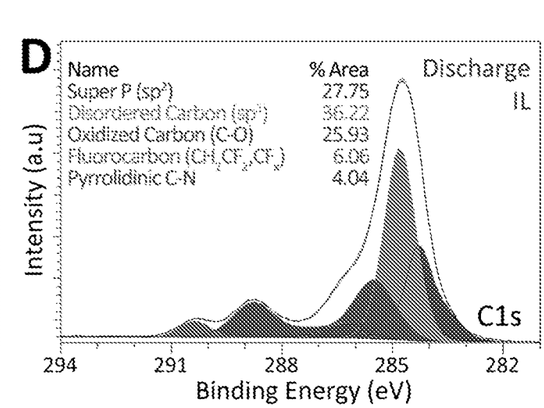
FIGS. 3D and 3F are C1s spectra of electrodes cycled in an ionic liquid (IL) electrolyte; a less massive aliphatic layer observed on discharge (FIG. 3D), and an increase in N and F functionalities was observed on charge (FIG. 3F).
Figure 3E:
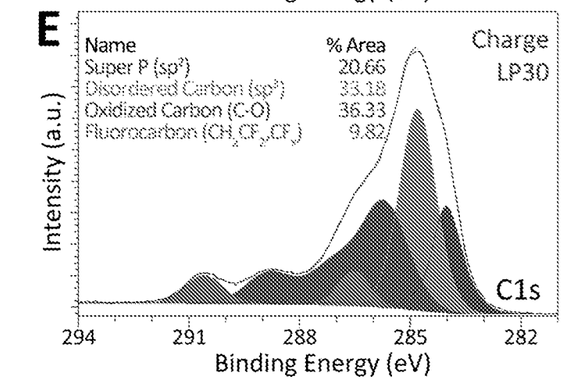
Figure 3F:
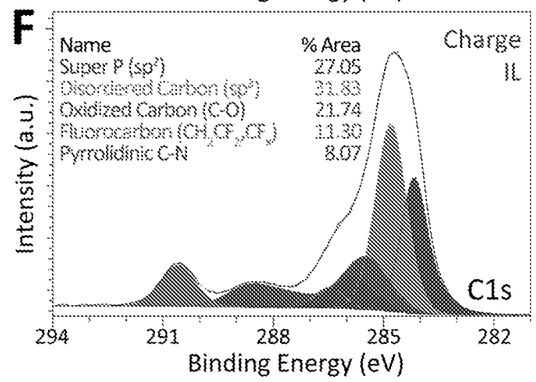
Figure 3G:
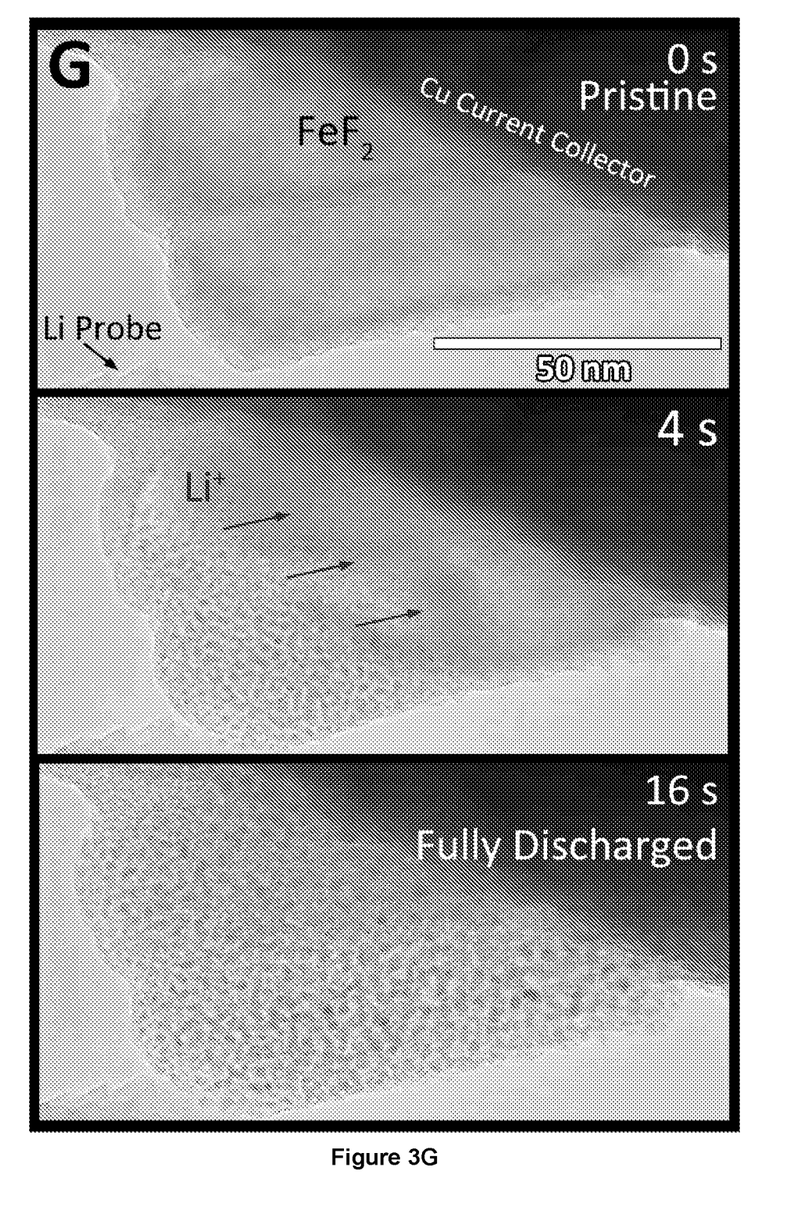
FIG. 3G shows TEM micrographs extracted from an in-situ lithiation (discharge) experiment, illustrating the fusing of adjacent $FeF_2$ particles. Prior to lithiation (top), a distinct boundary was apparent between the two nanorods. During the lithiation (middle), propagation of the reaction front from one rod to the next obscured the boundary. In the fully discharged state (bottom), the boundary was no longer apparent.
Figure 3H:
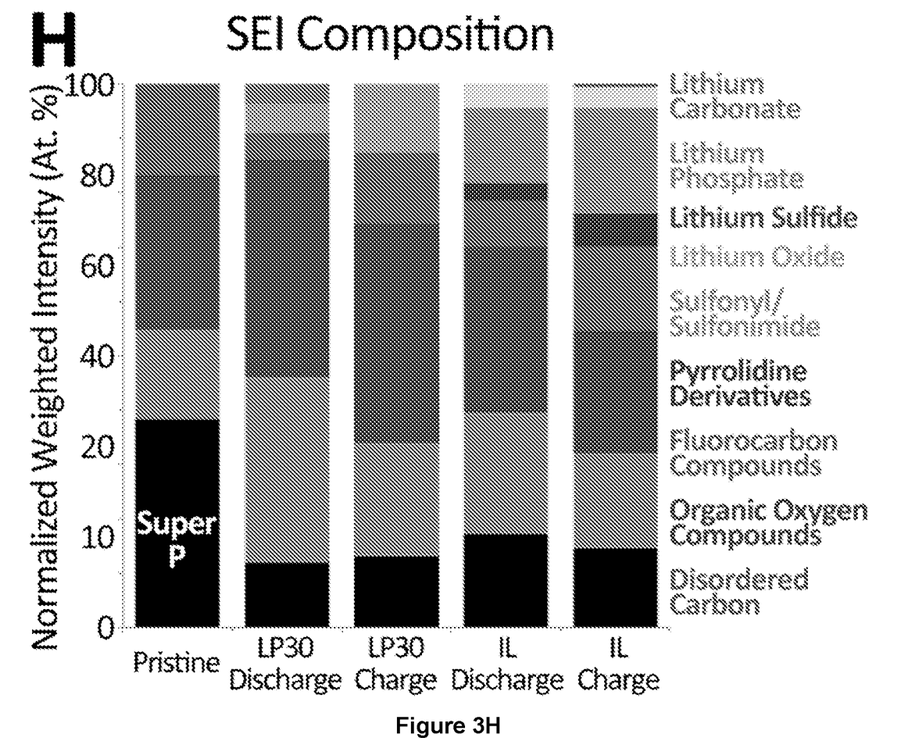
FIG. 3H is a chart summarizing the XPS-derived surface composition for the samples shown in FIGS. 3C-3F. Each component was derived from deconvoluted high resolution spectra weighted by their abundance in the survey spectrum.

XPS spectra of cycled electrodes, after removal of residual electrolyte, explain the electrochemical stability of the IL-derived SEI (FIGS. 3C to 3F). In both electrolytes, the first discharge deposits of large amounts of aliphatic carbon with some oxygen functionalities. This phenomenon is indicated by the intense $sp^3$ signal in the C1s spectra and the diminishing of peaks related to Super P™ and PVDF and is more pronounced in LP30 (FIGS. 3C and 3D). The SEI formed from the ionic liquid contains significantly more inorganic components including sulphur compounds and $Li_2O$ derived from the FSI (FIG. 3H). On charging, this inorganic component is increased, while the organic material becomes increasingly functionalized with nitrogen and fluorine. These additional elements may prevent the SEI from redissolving. The IL-derived SEI is manifest in the ex-situ TEM images (FIG. 3B) as an intact surface coating. The LP30-derived SEI is completely dissolved under identical sample preparation conditions in N-methyl pyrrolidone (NMP) (FIG. 3A). In LP30, $Li_2CO_3$ is formed on discharge but completely consumed on charge (FIGS. 3C and 3E); a significant portion of the organic component is also dissolved, while the concentration of $Li_4P_2O_7$ nearly doubles (FIG. 3H). This redox behaviour likely contributes to the low coulombic efficiency (FIG. 2B).

The increasing thickness of the SEI layer appears to be the major cause for the increasing hysteresis and pronounced capacity fade. However, a second mechanism is clearly present in the fusing of the $FeF_2$ nanorods during discharge. Large irregular particles appear immediately after the first discharge (FIG. 3A). This rapidly increases the particle sizes beyond the length-scale of the reconversion reaction, leaving effectively dead material at the centre. In-situ TEM measurements in the absence of electrolyte showcase the propagation of the reaction front across interparticle boundaries such that two nanorods appear to react as one (FIG. 3G). This phenomenon was not observed in the IL electrolyte (FIG. 3B). It is possible that electrostatic interaction between the IL and $FeF_2$ surface creates a strongly bound solvation layer, effectively separating the particles during cycling. In any case, the monodispersity and morphology of the nanorods is maintained during cycling, enabling definitive mechanistic conclusions.

$FeF_2$ Nanorods

Figure 1A:
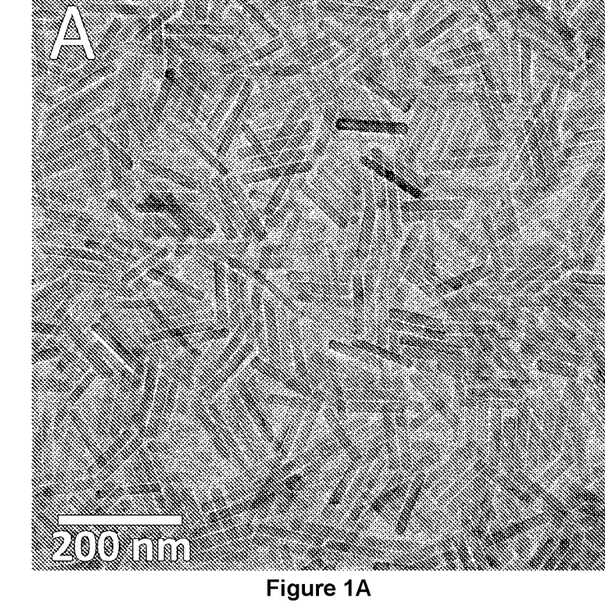
FIG. 1A is a TEM image of $FeF_2$ nanorods in accordance with the invention, which have a uniform morphology, with widths and lengths of about 20 nm and about 100 nm respectively.

The slow rate of the $Fe(CF_3COO^-)_2(CF_3COOH)$ precursor decomposition prevents repeated nucleation events, promoting uniform growth. The resultant nanorods are monodisperse (FIG. 1A) to the point of spontaneously packing into superlattices, when dried as a powder. Surfactants assist with stabilizing the high surface area particles and preventing agglomeration and the consequent growth of irregular morphologies. Fourier transformed infrared spectroscopy (FTIR) shows that oleic acid (OLAC) is present as the only capping agent after washing. The reduction potential of aliphatic carboxylic acid groups is below 1.0V vs. $Li^+/Li$ respectively. Therefore, oleic acid should not exhibit detrimental redox reactions in the potential window used for galvanostatic cycling.

Figure 1B:
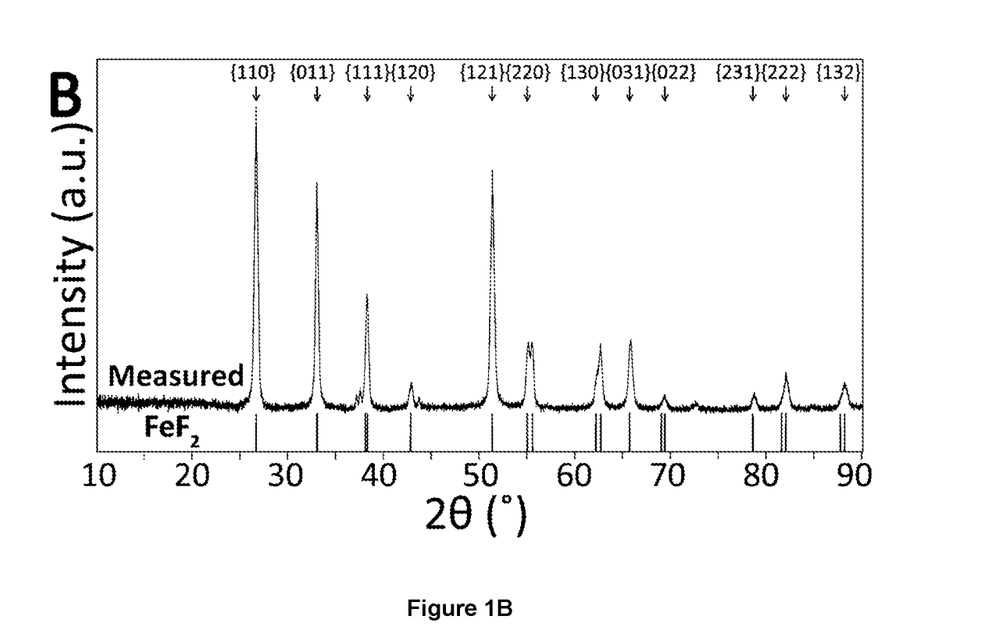
FIG. 1B is a powder XRD pattern of $FeF_2$ nanorods in accordance with the invention, which show phase-pure iron fluoride.
Figure 1C:
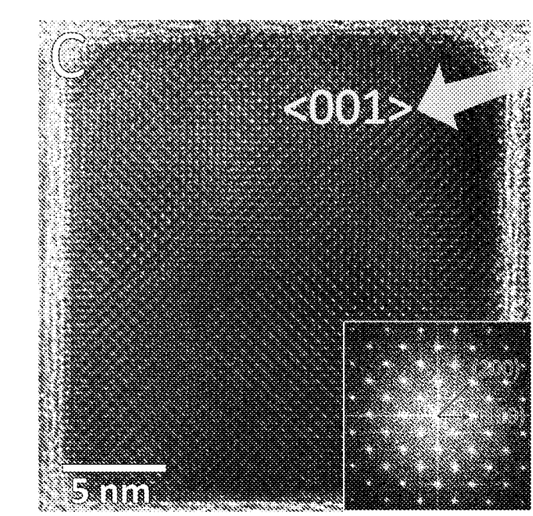
Figure 1D:
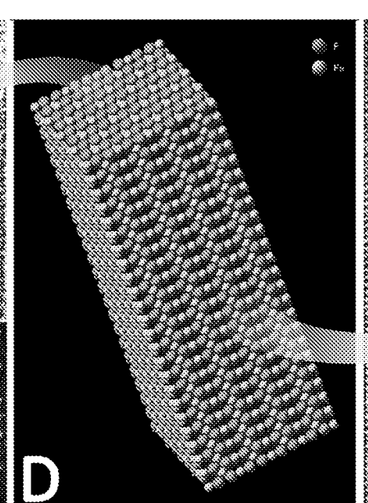
FIG. 1D shows a space-filling model of a single nanorod derived from the standard CIF file of $FeF_2$. Grey arrows demonstrate how a 2D projection of the nanorod along the <001> and <110> directions resulted in the observed TEM images B and D respectively.
Figure 1E:
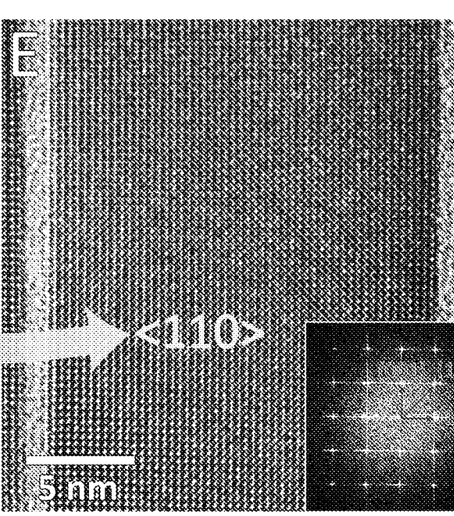
FIG. 1E is a HRTEM image of a single $FeF_2$ nanorod when viewed from the side, along the <110> zone axis. The FFT shown in the inset affirms the lattice orientation derived from B. FFTs in B and D were set to the same scale.

The tetragonal symmetry of the $FeF_2$ crystal system is reflected in the nanorod morphology. The nanorods exhibit facets dominated by the {110} planes on the sides and bounded by a curved surface tangent to the {001} planes on the end (FIG. 1D). Faceting causes the rods to naturally fall on their side in the <110> zone axis orientation (FIG. 1E), which is used as a common reference frame to image the conversion reaction. The <001> zone can be seen from an end-on view (FIG. 10) and is distinguished from the <110> zone by the greater number of reflections. The two perspectives unequivocally show that the lattice is oriented with the <001> along the length of the rod, and the <110> normal to the sides.

Figure 1F:
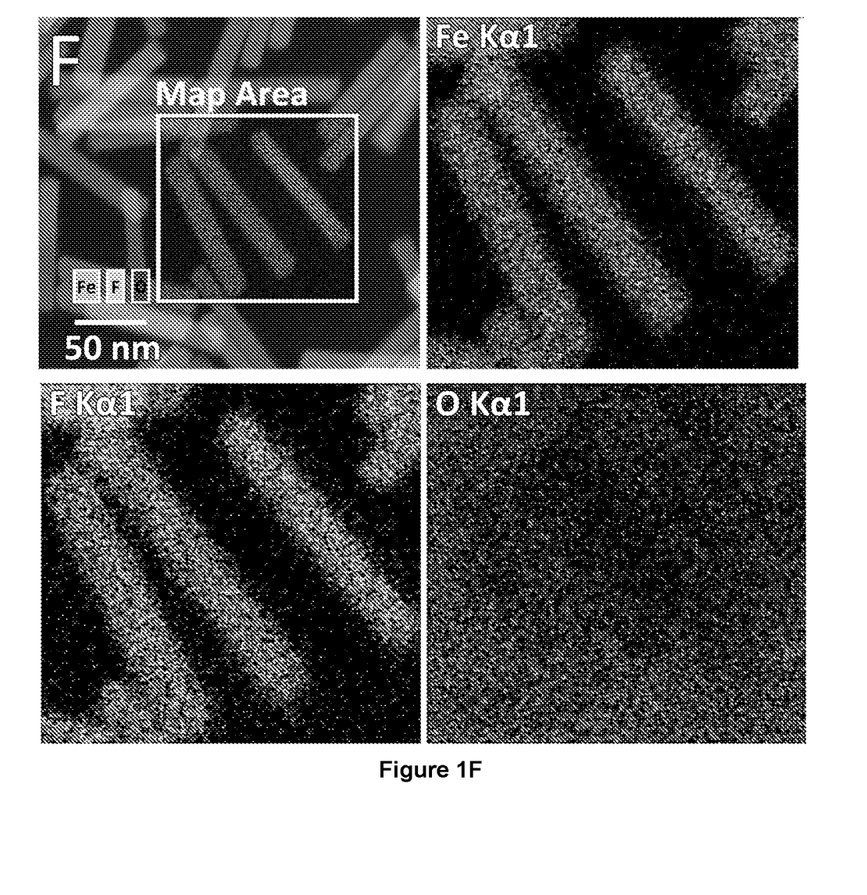
FIG. 1F is an EDX map of the $FeF_2$ nanorods, which shows strong Fe and F signals and excludes the presence of oxyfluoride.

These nanorods are nearly the equilibrium Wulff shape for $FeF_2$. The presence of any oxy-fluoride phase is excluded by x-ray diffraction (XRD) and energy dispersive x-ray spectroscopy (EDX) (FIGS. 1B and 1F). The refined c-lattice parameter from the powder XRD pattern closely matches the literature value of chemically pure $FeF_2$. Additionally, EDX shows a shadow in the oxygen intensity in the area of the nanorods further indicating the absence of oxyfluoride (FIG. 1F).

CONCLUSIONS

The full potential of electrochemical energy storage device comprising an $FeF_2$ electrode is achieved when combined with the $LiFSI/Pyr_{1,3}FSI$ ionic liquid (IL) electrolyte. The use of an IL prevents the fusing of particles during cycling, which also allows for accurate assessment of morphological and structural transformations. The ability of this IL electrolyte to enable reversible cycling without the use of impractical carbon scaffolds or the introduction of otherwise inactive material is paramount to the realization of high energy density transition metal fluoride LIBs. Furthermore, the use of an ionic liquid electrolyte enables the reversible cycling of transition metal fluoride LIBs at elevated temperatures for improved power density in a safe, thermally stable format.

The colloidal synthesis of single crystalline, monodisperse $FeF_2$ nanorods shows excellent electrochemical performance.

The invention claimed is:

1. A lithium-ion battery comprising:
    a first electrode comprising a transition metal fluoride;
    a second electrode; and
    an electrolyte comprising an ionic liquid;
    wherein the transition metal fluoride has the formula $MF_n$;
    wherein M is a transition metal selected from iron, copper, manganese, chromium, scandium, titanium, vanadium and zinc; and
    n is an integer from 2 to 5.

2. The lithium-ion battery of claim 1, wherein the transition metal fluoride is iron (II) fluoride ($FeF_2$), iron (III) fluoride ($FeF_3$), copper (II) fluoride ($CuF_2$), manganese (II) fluoride ($MnF_2$), manganese (III) fluoride ($MnF_3$), chromium (II) fluoride ($CrF_2$), chromium (III) fluoride ($CrF_3$) or mixtures of two or more thereof.

3. The lithium-ion battery of claim 2, wherein the transition metal fluoride is iron (II) fluoride ($FeF_2$).

4. The lithium-ion battery of claim 1, wherein the first electrode comprises the transition metal fluoride in the form of nanorods.

5. The lithium-ion battery of claim 1, wherein the ionic liquid comprises a bis (fluorosulfonyl) imide (FSI) anion or a bis (trifluoromethanesulfonyl) imide (TFSI) anion.

6. The lithium-ion battery of claim 1, wherein the ionic liquid comprises a quaternary ammonium cation, an imidazolium cation, a pyridinium cation, a piperidinium cation, a pyrrolidinium cation, a pyrrolinium cation, an isoquinolinium cation, a triazolium cation or a pyrazolium cation.

7. The lithium-ion battery of claim 1, wherein the ionic liquid has a dynamic viscosity of 20 to 100 mPa·s at a temperature of 25° C.

8. The lithium-ion battery of claim 1, wherein the first electrode is a cathode and the second electrode is an anode.

9. The lithium-ion battery of claim 1, wherein the second electrode comprises lithium.

10. The lithium-ion battery of claim 9, wherein the second electrode is a lithium metal electrode.

11. A method of preparing an electrode for a lithium-ion battery comprising a transition metal fluoride in the form of nanorods wherein the transition metal fluoride has the formula $MF_n$;
    wherein M is a transition metal selected from iron, copper, manganese, chromium, scandium, titanium, vanadium and zinc; and
    n is an integer from 2 to 5,
    wherein the method comprises:
        heating a trifuoroacetate salt of a transition metal or a hexafluoroacetylacetonate salt of a transition metal in a solvent comprising a surfactant to a temperature of 250° C. to 350° C. under an inert gas, wherein the transition metal is selected from iron, copper, manganese, chromium, scandium, titanium, vanadium and zinc.

12. The method of claim 11, wherein the method comprises heating a trifluoroacetate salt of a transition metal, which is iron (II) trifluoroacetate, iron (III) trifluoroacetate, copper (II) trifluoroacetate or manganese (II) trifluoroacetate.

13. The method of claim 11, wherein the solvent is 1-octadecene, 1-eicosene, 1-docosene, octadecane, eicosane, docosanem benzyl ether or octyl ether.

14. The method of claim 11, wherein the inert gas is nitrogen ($N_2$) or argon (Ar).

15. The method of claim 11, wherein the surfactant is oleic acid, oleyl amine, octadecanoic acid or octadecyl amine.

16. The lithium-ion battery of claim 1, wherein the ionic liquid comprises a tetravalent nitrogen cation.

17. The lithium-ion battery of claim 1 comprising an amount of the ionic liquid of from 50 to 95% by weight of the electrolyte.

18. The lithium-ion battery of claim 1 further comprising a separator, which separates the first electrode and the second electrode.

\* \* \* \* \*